2,924,513
ROTARY KILN

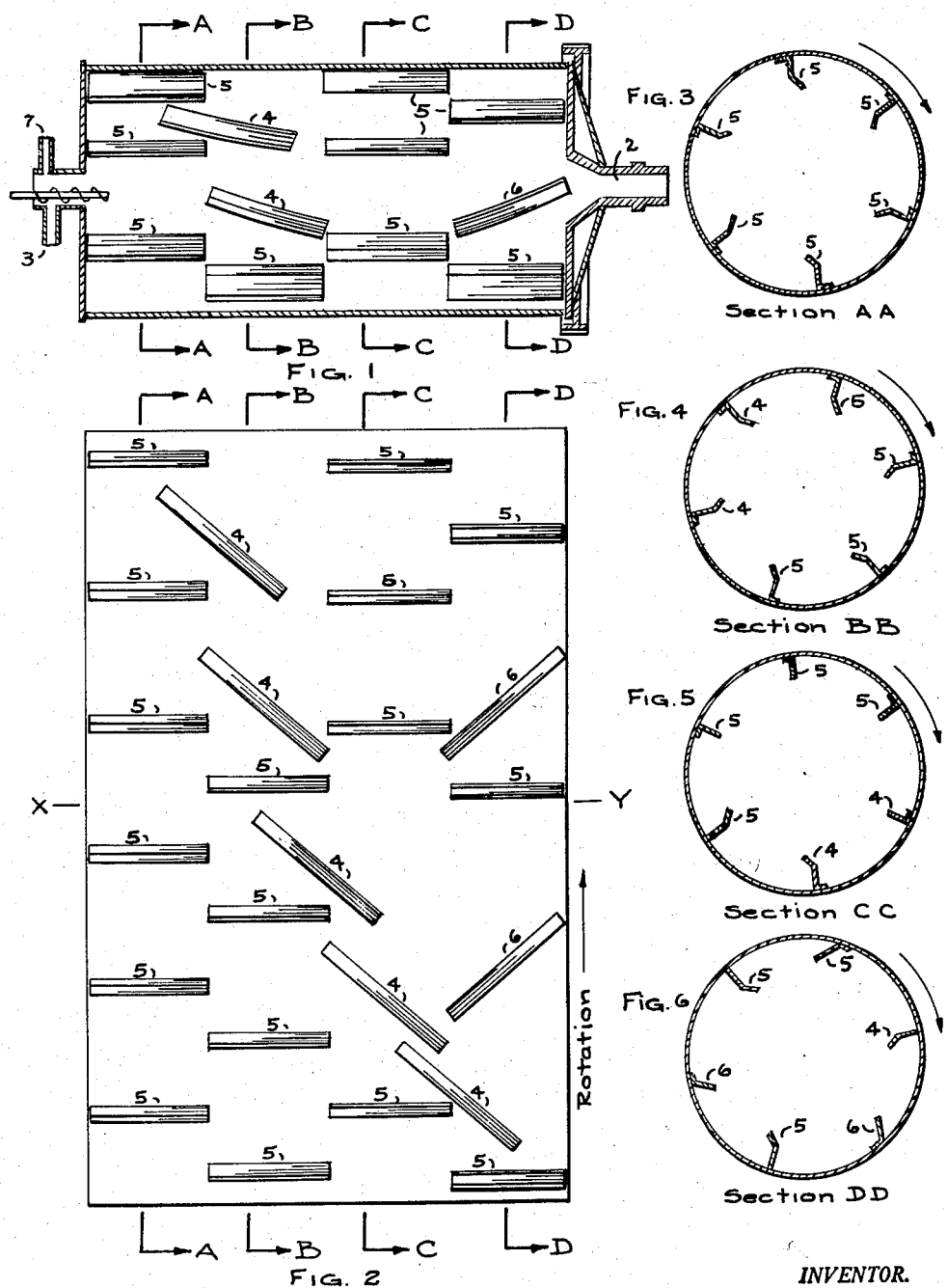

David F. Altimier, Niagara Falls, N.Y., and Cecil J. Doubt, Woodbury, N.J., assignors to E. I. du Pont de Nemours & Company, Wilmington, Del., a corporation of Delaware Application January 6, 1955, Serial No. 480,196

2 Claims. (Cl. 23—279)

This invention relates to improvements in a rotary kiln type of reactor in which improved reaction is achieved between a gaseous component and a liquid dispersed over solid reaction product. In particular, the improvement concerns the production of sodium monoxide from sodium and oxygen.

The conversion of an alkali metal to its oxide usually takes place in a rotary kiln or burner into which the metal is charged so as to become distributed in molten form over a relatively large amount of alkali oxide previously formed. The metal, in dispersed form, is contacted with a dry gas containing oxygen and otherwise free from undesirable reactive components. The gas, usually purified air, is fed into the rotating kiln counter to the flow of the metal oxide produced therein. The spent air or off-gas is removed at the charge end at which the metal is fed into the kiln while make-up air is conducted into the kiln at the product discharge end.

A major difficulty with apparatus of this type used heretofore in the production of sodium oxide is the formation of excessive amounts of very fine powder. Such fines are unsatisfactory for various subsequent operations or uses of the oxide, such as the production of a good grade of sodium peroxide. They also tend to be blown out of the reactor or burner in excessive amounts with the off gases causing separation problems of various degrees of difficulty and representing losses of product and reduced production rates.

We have discovered that the excessive production of fines is related to inadequate residence time of the fine particles in the zone or area where liquid sodium is fed into the burner and where the sodium should spread over preformed sodium oxide.

The primary object of the present invention is the production of better grades of sodium monoxide. Another object is the reduction of fines in the product. A further object is to produce a product consisting of particles of a more uniform size. A still further object is the provision of means whereby the tendency of fines to be blown out of the kiln will be decreased. And it is an over-all objective to increase the rate of production of sodium monoxide in a kiln along with the simultaneous increase in product quality. Other objects will be apparent from the detailed description of the invention.

These objectives can be achieved in large measure by providing conditions which will permit a larger proportion of the fine particles to grow to the desired size. One way to do this is to increase the residence time of the sodium monoxide burden or carrier in that part of the reactor in which the small particles grow most rapidly. It has been discovered that in general, the most rapid growth or enlargement of the fine particles takes place in that zone in the kiln or burner in which the sodium is added to the sodium monoxide. And this can be largely accomplished by providing a new arrangement of mixing flights or mixing blades attached to the inner cylindrical wall of the rotary kiln in which liquid sodium and oxygen react to form sodium monoxide such that the charge of monoxide which acts as the dispersant or carrier for the sodium is redirected from the discharge end towards the charge end so as to increase its residence time in the sodium feed zone. This can be accomplished in one embodiment of our invention by providing three sets of flights. One set is helically attached near the sodium feed end of the kiln and adapted to move the burden toward the discharge end. Another set of flights, also helically arranged, is adapted to move or recycle the burden from the product discharge end back to the sodium feed area. A third set of flights is arranged parallel to the kiln. Some or all of the flights are adapted to lift the burden with the rotation of the kiln or burner and to shower the solid through the gas-filled area or zone of the burner thereby increasing the effective contact between the reactants. Furthermore, by thus building up the amount of sodium monoxide in the sodium feed zone a larger proportion of the fine particles of sodium monoxide will tend to grow larger than if the monoxide is permitted to distribute itself evenly throughout the burner. The over-all residence time of the sodium monoxide in the burner is not materially increased by this method of accumulating the carrier in the sodium dispersion zone. What seems to happen is that the undesired fines are kept longer in this zone than in the other zones of the burner and are, therefore, in a better location to grow the particle sizes more acceptable for subsequent use and their tendency to be blown out of the reactor with the off-gases is also reduced. And the result of this is that the production of sodium monoxide in the burner so operated is increased over previous production rates.

The drawing illustrates one embodiment of the present invention as specifically applied to the reaction of sodium dispersed on sodium monoxide with oxygen-containing gas.

Figure 1 is an elevation in cross section of the rotary kiln with exposed flights.

Figure 2 shows the inner wall of the kiln as viewed if it were slit longitudinally and laid out to form a rectangle, with exposed flights. The flights in the rectangle above X—Y correspond to the exposed flights in Figure 1.

Figure 3 is a vertical cross section of Figure 1 at A—A.
Figure 4 is a vertical cross section of Figure 1 at B—B.
Figure 5 is a vertical cross section of Figure 1 at C—C.
Figure 6 is a vertical cross section of Figure 1 at D—D.

The rotary kiln 1 contains on the inside several types of mixing flights or lifting blades attached to the inner wall. Liquid sodium is fed into the burner at the charge end as at 2 through a feed arrangement not shown and the product, sodium monoxide ($Na_2O$), is discharged at 3 through a suitable device not shown in detail. The oxygen-containing gas is fed into the burner at the discharge end as at 7 through a device not shown in detail and the spent gas, primarily nitrogen when purified air is the source of the oxygen, leaves the kiln at the charge end 2 through a device not shown in detail.

Parallel flights 5 are arranged throughout the kiln parallel to the axis of the kiln. Recycling flights 4 arranged helically at an angle are adapted to shift the kiln burden to the charge end as the kiln rotates. Feed end flights 6 are relatively few in number and positioned only in the feed end portion of the kiln adapted to move the burden away from the feed end wall to a zone at approximately section D—D in the reaction zone of the burner.

In Figure 2 the helical recycling flights 4 are shown spiraling in the same direction as the kiln rotates whereas the helical feed end flights 6 are shown as spiraling in the direction opposite to the rotation of the kiln.

In general, the parallel flights are the most numerous and serve chiefly to keep the burden in the kiln from settling and agglomerating. Preferably, the parallel flights are discontinuous but are arranged throughout the length of the kiln. With parallel flights alone in the kiln, the charge or burden will move gradually from the charge end to the discharge end and it is difficult to obtain the product in reasonably uniform particle size.

Recycling flights are provided in sufficient number so that by their lifting and mixing action they tend to move the burden backwards from the discharge end and toward the charge end. This action causes a recycling of much of the solid material in the kiln, and seems especially to effect the growth of the particles in such a way that they become of more uniform size particularly at the expense of the fines.

Charge or feed end flights are preferably used in small numbers, generally one or two will be sufficient. These flights tend to move the material away from the charge end and bring it into the zone where particle growth tends to be greatest. It will be seen that the recycling flights and the feed end flights serve to build up the burden in that zone of the kiln in which the sodium feed is charged into the preformed sodium monoxide. This zone is the one in which the greater part of the reaction between sodium and oxygen takes place.

This arrangement of flights which results in the recycling of major portions of the sodium monoxide, builds up the burden of sodium monoxide in the major reaction zone, assists in spreading the liquid sodium more effectively over a greater amount of the carrier or disperser, thereby increasing the rate at which sodium monoxide can be produced in the kiln as compared to the previous arrangement of parallel flights. This zonal or local area build-up or accumulation of carrier in the sodium dispersion zone also brings about a more effective growth or consolidation of the very small or fine particles of sodium monoxide into larger particles which have greater utility.

The shape of the flights should be such that as the kiln turns on its axis effective amounts of the burden in the reactor containing the dispersed sodium are lifted upward and showered through the gas-filled interior to enhance effective contact between the reactants. This scooping and showering action also aids in dispersing the sodium effectively over the sodium monoxide carrier and appears to assist especially in the growth of the smaller particles. There may be lips on the flights or they may be in the shape of scoops or otherwise fashioned to serve the purpose of lifting the burden and showering it through the free space in the kiln. The Figures 3, 4, 5 and 6 show one form or shape of flights found especially effective, but other shapes may also be satisfactory and the invention is not limited in this respect.

The process of oxidizing sodium in the apparatus of this invention is a continuous operation. The reactor or kiln holds a relatively large burden of sodium monoxide which acts as a carrier for the liquid sodium dispersed thereon. And accumulating the carrier in large masses in the sodium feed zone helps to avoid localized excesses of sodium which would make for sticky aggregates. Such aggregates do not tumble easily with the rotation of the burner and their formation thus interferes with rapid and efficient production. The flight arrangement permits a recirculation of more or less of the sodium monoxide into the zone where the sodium is introduced and spread over the burden. This zone will be near the sodium feed end of the kiln but preferably a slight distance therefrom, say at a distance from the feed end equal to at least 20% of the radius of the kiln. We designate this as the sodium feed zone since it is in this area that the sodium mixes with or spreads over the sodium monoxide carrier and it is also in this zone that a significant amount of the oxidation takes place.

This invention is specifically described as related to the oxidation of sodium but is generally useful where a liquid spread over a solid carrier is reacted with gas.

We claim:

1. In a rotary kiln for conducting a reaction between a gas and a liquid spread over solid carrier an arrangement of mixing flights attached to the inner circumferential wall of said kiln comprising helically attached feed end flights in the liquid feed end of said kiln spiraling in a direction opposed to the direction of rotation of said kiln, helically attached recycling flights arranged between the discharge end of said kiln and the liquid feed zone of said kiln spiraling in the direction of rotation of said kiln, and flights attached parallel to the axis of rotation of said kiln and distributed throughout said inner circumferential wall.

2. In apparatus for the oxidation of alkali metal the combination comprising a cylindrical vessel adapted to rotate horizontally on its axis, means for feeding liquid alkali metal through the charge end of said vessel, means for withdrawing alkali metal oxide from the discharge end of the vessel, means for feeding oxygen containing gas into the discharge end of said vessel, means for removing gas depleted in oxygen from the charge end of said vessel, and mixing flights attached to the inner circumferential wall of said cylindrical vessel, said flights comprising helical feed end flights spiraling in a direction opposite to the direction of rotation of said vessel and helical recycle flights between the discharge end and the liquid feed zone of said vessel, said recycle flights spiraling in the direction of rotation of said vessel, and flights attached parallel to the axis of rotation of said vessel and distributed throughout said inner circumferential wall.

References Cited in the file of this patent

UNITED STATES PATENTS

| | | |
|---|---|---|
| 1,004,509 | Washburn | Sept. 26, 1911 |
| 1,048,738 | Sanborn | Dec. 31, 1912 |
| 1,336,422 | Burman | Apr. 13, 1920 |
| 1,450,912 | Cottringer et al. | Apr. 10, 1923 |
| 1,685,520 | Carveth | Sept. 25, 1928 |
| 2,578,166 | Bill | Dec. 11, 1951 |
| 2,685,500 | Hulse et al. | Aug. 3, 1954 |
| 2,739,797 | Kemper | Mar. 27, 1956 |